S. KUH.
Processes of Packing Eggs for Transpertation.
No. 154,553. Patented Sept. 1, 1874.

WITNESSES
Franck L. Curand
C. L. Everts.

INVENTOR
Sol Kuh.
per
Alexander Mator
Attorneys

UNITED STATES PATENT OFFICE.

SOL KUH, OF JEFFERSON, IOWA.

IMPROVEMENT IN PROCESSES OF PACKING EGGS FOR TRANSPORTATION.

Specification forming part of Letters Patent No. 154,553, dated September 1, 1874; application filed July 11, 1874.

*To all whom it may concern:*

Be it known that I, SOL KUH, of Jefferson, in the county of Greene and in the State of Iowa, have invented certain new and useful Improvements in a Process for Packings Eggs for Transportation; and do hereby declare that the following is a full, clear, and exact description thereof, reference being had to the accompanying drawings and to the letters of reference marked thereon, making a part of this specification.

The nature of my invention consists of a process for packing and transporting eggs by placing shelled eggs in a many-chambered tray and covering said tray with a cloth saturated with a preservative material, said tray or trays being inclosed in a box, all as more fully hereinafter set forth.

Figure 1:
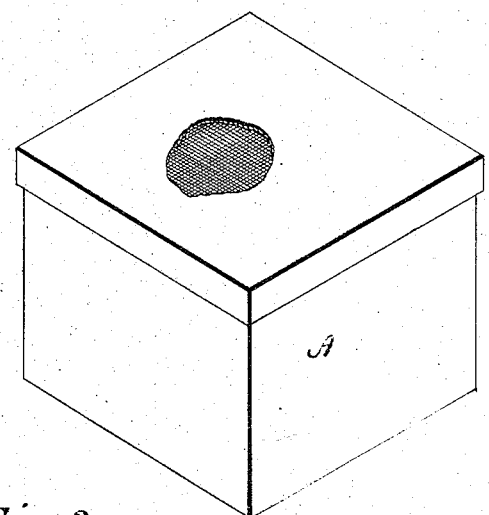
Figure 2:
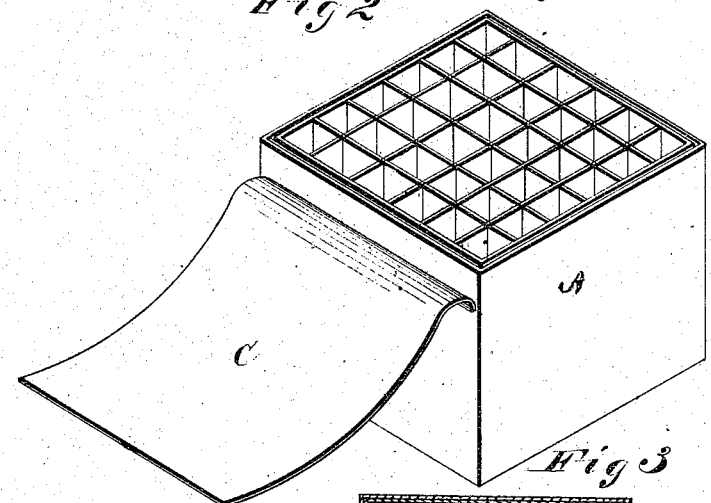
Figure 3:
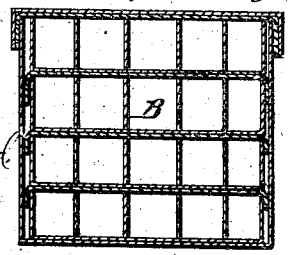

In the drawings, Figures 1 and 2 are perspective views of my box, and Fig. 3 a cross-section.

In the figures, A represents a box, made of any suitable material and size. Within this box are placed a series of smaller boxes composed of or filled with cellular compartments. These compartments may be made to hold one or a dozen eggs, or more, if necessary.

In using this invention, I first break the eggs and pour the contents into the compartments B, throwing away the shells. When said compartments are sufficiently full I place over them a cloth which is saturated in salt and water. The cloth is placed over the smaller boxes in such manner as to exclude the air from them as nearly as possible. The compartments or trays are then placed in the box A and covered by a lid.

Any suitable advertising-labels may be pasted on the box, and the box may be placed in a paper or pasteboard covering or envelope for more perfect security against frost or cold.

By this mode a larger number of eggs can be transported in the same bulk or space. They keep equally well, if not better, and for ordinary purposes are as good with yolk and white mixed as they are in shell, when they can be separated.

I am aware that an egg-carrier consisting of a box having compartments or cells to contain the unshelled eggs separately is not new.

What I claim is—

A process for packing and transporting eggs, consisting, essentially, of placing shelled eggs in cells or chambers in a many-chambered close box, and covering said chambers first with a cloth saturated with a preservative material, and then by a suitable tightly-fitting lid, all substantially as set forth.

In testimony that I claim the foregoing I have hereunto set my hand this 3d day of July, 1874.

SOL KUH.

Witnesses:
C. H. JACKSON,
GEORGE BRIDGEFORD.